United States Patent Office 3,071,565
Patented Jan. 1, 1963

3,071,565
CROSS-LINKING OF POLYMERS
Horace R. Davis, Jr., Roseville, Minn., Francis J. Honn, Boston, Mass., Charles B. Griffis, Drexel Hill, Pa., and Juan C. Montermoso, Washington, D.C., assignors, by mesne assignments, to Minnesota Mining and Manufacturing Company, St. Paul, Minn., a corporation of Delaware
No Drawing. Continuation of application Ser. No. 416,445, Mar. 15, 1954. This application Dec. 21, 1959, Ser. No. 860,656
9 Claims. (Cl. 260—77.5)

This invention relates to the cross-linking of polymers and, more particularly, to the modification of the characteristics of chain saturated polymers containing halogen substituents on the carbon atoms.

Chain polymers are thermoplastic in nature. They exhibit continuous flow under the influence of heat and pressure. Such polymers can be resoftened as often as desired and are usually soluble in selected solvents.

Cross-linked or space polymers, on the other hand, are generally thermosetting, that is to say that they cannot be softened without decomposition once they have hardened and that they are insoluble in all solvents. A chain polymer may, however, contain a small number of cross-linkages without completely losing its thermoplastic properties.

It is often desirable to convert chain to space polymers. This is done when it is desired to decrease solubility and thermoplastic flow and, in the case of chain elastomers, where it is desired to obtain a harder, tougher product. The cross-linking of elastomers is commonly referred to as vulcanization.

The nature of the cross-linking agent will vary with the nature of the chain polymer and with the nature of the cross-link desired. There are a number of reactions which may result in the cross-linking of a chain polymer. In some reactions the cross-linking agent will take part so that at least a portion of it forms the cross-link and appears in the final cross-linked molecule. In other reactions the cross-linking agent acts solely as an activator and does not appear in the final molecule.

The chemistry of cross-linking is imperfectly understood. Cross-linking agents successful with one type of chain polymer are often ineffective with another type. There appears to be no rule for predicting with accuracy whether or not a particular cross-linking agent effective with one type of chain polymer will be effective with another type. In fact, the term "cross-linking agent," itself, covers materials which are chemically and physically dissimilar and have in common the sole characteristic that each is effective for the cross-linking of at least one chain polymer.

Among the most useful of the thermoplastic resins are those prepared by the polymerization of highly halogenated monoolefins and particularly those prepared from highly halogenated ethylenes. Among the resins prepared by the polymerization of such substituted monoolefins are the homo and copolymers of 2-chloroperfluoropropylene, chlorotrifluoroethylene, bromotrifluoroethylene, trifluoroethylene, chlorofluoroethylene, and vinylidene fluoride.

Many of these thermoplastic polymers have unique and valuable properties. In some cases, it may be desired to retain these unique and valuable properties while at the same time decreasing thermoplastic flow and solubility by cross-linking. In the past, it has been difficult to cross-link polymers of this type satisfactorily.

It has been suggested that polyfunctional organic compounds containing at least two primary or secondary amino groups can be used as linking agents for polymers of this type. These polyamines have been found to possess a high order of activity as cross-linking agents. However, the polyamines, by their very activity, operate at a disadvantage insofar as practical vulcanization processes are concerned.

The vulcanization of a rubbery material is ordinarily begun by blending the vulcanizing agent into the material by mechanical shearing forces. This blending takes time and the shearing forces generate heat. The high temperature thus generated causes the initiation of the cross-linking reaction prior to the thorough blending of the vulcanizing agent into the material, which reaction is self-accelerating since it is exothermic and increases the temperature still further. Vulcanization with localized high concentrations of vulcanizing agent results in "scorching" or over-vulcanization and produces a brittle, non-uniform product.

It is an object of this invention to cross-link highly halogenated chain saturated polymers to produce a uniform product.

It is a further object of this invention to cross-link chain polymers prepared by the polymerization of highly halogenated monoolefins to produce a uniform product.

It is a further object of this invention to produce a uniform product by cross-linking chain polymers containing the recurring unit —CYZ— wherein Y and Z are selected from the group consisting of the halogens and hydrogen, said units being in chains which are at least half halogenated, but not completely fluorinated. The term "at least half halogenated" as used herein is intended to mean substitution by halogen atoms at at least half of the possible positions for such substitution.

It is a further object of this invention to produce a uniform product by cross-linking chain polymers containing the recurring unit —CFCl— in chains which are at least half halogenated.

It is a further object of this invention to convert thermoplastic chain polymers produced by the polymerization of highly halogenated monoolefins to uniform thermosetting space polymers of reduced solubility and thermoplastic flow.

It is a further object of this invention to convert the thermoplastic homopolymer of chlorotrifluoroethylene to an insoluble and infusible space polymer of uniform characteristics.

It is a further object of this invention to convert chain elastomers, produced by copolymerization of halogen-containing monoolefins into uniform soft vulcanizates of increased strength but adequate and in some cases even superior extensibilty and retractability.

A still further object of this invention is to vulcanize uniformly the rubbery copolymers of chlorotrifluoroethylene and vinylidene fluoride.

A still further object of this invention is to produce cross-linked halogenated polymers which increase in tensile strength upon aging.

Other objects will appear hereinafter.

These and other objects are accomplished by the following invention:

Reactants capable of producing amino cross-linking agents under the reaction conditions prevailing during the cross-linking operation are introduced into the chain saturated polymers and permitted to produce amino cross-linking agents, which in turn, produce organic linkages between the polymer chains. Reactants which produce amino cross-linking agents slowly and at high temperatures are preferred.

The chain saturated polymers which may be cross-linked in accordance with this invention are those which are produced by the polymerization of highly halogenated monoolefins and, in particular, those polymers which are at least half halogenated. It is necessary that halogenated carbon atoms be present in the molecular chain, but it is preferable that —$CF_2$—, because of the nature of the polymers produced, should not be the sole recurring unit. In other words, the homopolymers of tetrafluoroethylene, perfluoropropylene and other perfluorinated olefins and their copolymers with each other, which are ordinarily not thermoplastic in nature and insoluble in all known solvents, are not ordinarily linked by the method of this invention since such cross-linking does not have much physical significance. In general, it may be said that the preferred halogenated chain polymers which can be linked by the method of the present invention are those which retain the recurring unit —CYZ—, wherein C is carbon, and Y and Z are selected from the group consisting of halogens and hydrogen, the chain polymers being at least half halogenated but not completely fluorinated.

Among the chain saturated polymers which may be cross-linked in accordance with this invention are the homo and copolymers of 2-chloroperfluoropropylene, chlorotrifluoroethylene, bromotrifluoroethylene, dichlorodifluoroethylene (asym.), trifluoroethylene, chlorofluoroethylene, vinylidene fluoride, and vinylidene chloride. These olefins may be copolymerized with each other in groups of two or more and in any proportions. They may also be copolymerized with other olefinic compounds such as ethylene, tetrafluoroethylene and perfluoropropylene. Olefinic compounds with other functional groups, such as acrylic acid, acrylonitrile and their halogen substituents, may be used as copolymers with the aforementioned haloolefins.

In particular, the method of this invention is adapted to the cross-linking of chain polymers produced by the polymerization of perfluorochloroethylenes and perfluorobromoethylenes.

One of the most useful of the perfluorochloroethylene polymers is the polymer of chlorotrifluoroethylene. This particular polymer has now been developed to a stage in which it is commercially available and has many useful applications by reason of its chemical inertness and high physical strength and resilience, when in the form of a plastic. Four-fifths of the weight of polychlorotrifluoroethylene is made up of fluorine and chlorine. The plastic form of polychlorotrifluoroethylene is colorless and transparent and has a high chemical stability with no effect being observed on the polymer after prolonged exposure to hydrofluoric acid, hydrochloric acid and strong caustic solutions, as well as concentrated sulfuric acid, fuming nitric acid, aqua regia and other vigorous oxidizing materials. The plastic form of this polymer exhibits flexibility and resilience and is not affected by water, or by humidity and, in general, is an efficient electrical insulating material.

Normally solid plastic polymers of chlorotrifluoroethylene may be prepared by polymerizing the monomer in the presence of a suitable organic peroxide such as bistrichloroacetyl peroxide, as the polymerizing agent, at a temperature between about —20° C. and about 25° C., preferably at a temperature of about —16° C. At a temperature of —16° C. the polymerization of chlorotrifluoroethylene to a satisfactory yield of solid polymer is accomplished in about seven days. At elevated temperatures and at corresponding superatmospheric pressures, less time is required to complete the polymerization.

The chlorotrifluoroethylene polymers may be converted by the method of this invention to insoluble and infusible space polymers, which retain, for the most part, the desirable chemical inertness and physical strength of the plastic.

Perfluorochloroethylenes, and particularly chlorotrifluoroethylene, may be copolymerized with fluoroethylenes to produce rubber-like polymers displaying elastomeric properties, high tensile strength and flexibility at relatively low temperatures. These copolymers, and particularly the copolymers of chlorotrifluoroethylene and vinylidene fluoride, possess the above-mentioned physical properties and also show a high degree of chemical inertness. They are also relatively easily soluble in various solvents and vehicles prior to cross-linking.

The preferred proportions of the monomers chlorotrifluoroethylene and vinylidene fluoride for rubbery characteristics range from 20 to 69 mol percent of chlorotrifluoroethylene and, most preferably, from 25 to 50 mol percent.

The copolymerization reaction may be carried out in either a water suspension type system or in a mass polymerization system. In the former system the reaction is preferably carried out at a temperature between about 0° C. and about 35° C. In a mass polymerization system the reaction is preferably carried out at a temperature between about —20° C. and about 0° C. With the water suspension type system a redox catalyst system is preferred. It has no emulsifier and contains an oxidant, a reductant and a variable valence metal salt. The oxidant in the water suspension type recipe is preferably an inorganic persulfate, such as potassium persulfate, sodium persulfate or ammonium persulfate, the latter being most desirable. The reductant is preferably a bisulfite, such as sodium bisulfite or potassium bisulfite, and preferably the former. The variable valence metal salt which is employed for the purpose of regenerating the oxidant is preferably in the form of an iron salt, such as ferrous sulfate or ferrous nitrate with ferrous sulfate being the most desirable variable valence metal salt.

In the mass polymerization system, organic peroxide promoters, and particularly halogen-substituted acyl peroxides are used. Trichloroacetyl peroxide is a preferred promoter of this type. Other halogen-substituted organic peroxides suitable for carrying out the polymerization are trifluoroacetyl peroxide, difluoroacetyl peroxide, 2,4-dichlorobenzoyl peroxide, chloroacetyl peroxide, trifluorodichloropropionyl peroxide, and dichlorofluoroacetyl peroxide.

By the method of this invention these rubbery copolymers may be transformed into soft vulcanizates of increased strength and toughness, of decreased solubility and of adequate and in some cases even increased extensibility.

The amino cross-linking agents which are produced by the reactants introduced for cross-linking in accordance with this invention are those containing at least two amino groups which are primary or secondary. The amino groups of these cross-linking agents may be linked to any polyfunctional organic radical, either open chain or cyclic. Reactants capable of producing primary diamines are preferred.

In general, the reactants used for cross-linking, in accordance with the present invention, produce amino compounds which may be designated as having the following formula, $R(NHA)_n$ linkages, wherein R is a polyfunctional organic radical, N is nitrogen, H is hydrogen, A is a member of the group consisting of hydrogen and monofunctional organic radicals, and $n$ is an integer of at least 2. Reactants capable of producing secondary amines are considerably less reactive than those which produce primary amines.

The product of this cross-linking reaction is a uniform mass comprising a plurality of saturated carbon chains at least about half halogenated and cross-linked by a polyfunctional polyamine radical of the formula $$R(\overset{|}{N}A)_n$$

wherein R, N, A and $n$ are defined as above. Starting with half halogenated chains, the cross-linked product may be somewhat less than half halogenated due to the splitting off of hydrogen halide.

Among the specific classes of reactants which may be used in accordance with this invention are polyisocyanates, polyisothiocyanates, polyamine salts, polyureas, polycarbamyl halides and polyurethanes. Compounds of these classes, by their own decomposition or by reaction with other materials under curing conditions, are capable of producing polyamines and are capable of cross-linking halogenated chain polymers described above.

Although the applicants do not wish to be bound by any particular theory of operation, they believe that the reactants introduced by them into the chain saturated polymers produce polyamino compounds, which in turn, produce organic linkages between the polymer chains. It is believed that hydrogen-containing amino groups are effective as linking agents with the aforesaid halogen-containing chain polymers in that the hydrogen of the amino group and a halogen bonded to the carbon atom of the polymer chain combine to condense out a hydrogen halide molecule and thereby permit the nitrogen of the amino group to be bonded directly to the carbon atom from which the halogen has been removed. With a polyamine, more than one such linkage takes place on the molecule of the amino linking agent and thereby links one polymer chain to another. With the reactants of the present invention, which produce polyamines, it becomes possible to obtain even distribution of the cross-linking agents throughout the mass of the polymer prior to and during the course of the linking reaction.

Since hydrogen halide is evolved in the reaction, the linking proceeds most favorably when hydrogen halide is removed. To some extent, and particularly when cross-linking thin polymer sections, the hydrogen halide may be volatilized off at the temperatures used in the cross-linking reaction. In general, however, it is desirable to neutralize the hydrogen halide by the addition of a basic compound, and preferably an inorganic basic compound, such as lead oxide, magnesium oxide or zinc oxide.

It is well-known that isocyanates react with water in a basic medium to produce primary amines.

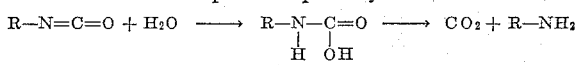

Similarly, a polyisocyanate will react to produce a polyamine. The polymers which are cross-linked in accordance with the present invention, and particularly those polymers prepared from a water suspension, ordinarily contain sufficient moisture to convert at least a portion of the polyisocyanates to polyamines and to produce a sufficient number of organic linkages to substantially change the characteristics of the polymer. Furthermore, the basic material which is preferably introduced to take up the hydrogen halide by-product of the cross-linking reaction produces additional moisture as it neutralizes this hydrogen halide and may also produce initial moisture since some hydrogen halide will ordinarily split out of the halogenated chain polymers, particularly at elevated temperatures and particularly in the presence of the aforesaid basic compound.

Thus, it is believed that the introduction of a mixture of an isocyanate and an inorganic basic compound such as zinc oxide into a copolymer of chlorotrifluoroethylene and vinylidene fluoride, initiates the following series of reactions:

(1)
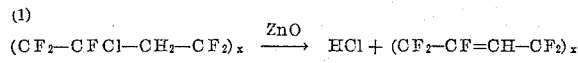

(2)
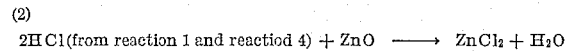

(3)
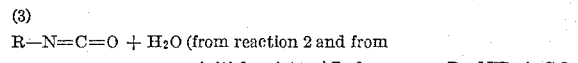

(4) 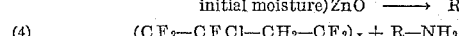
(5) 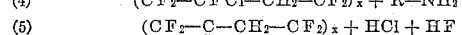

When the isocyanate is difunctional, the primary amine will be a diamine and the interaction of the diamine with the polymer will bring about cross-linking.

Among the polyisocyanates which may be used in accordance with this invention to cross-link halogenated chain polymers are: methylenedi-p-phenylene diisocyanate, 4,4'-diphenyl diisocyanate, p-phenylene diisocyanate, hexamethylene diisocyanate, 4-methyl-m-phenylene diisocyanate, s-phenenyl triisocyanate, 5-trifluoromethyl-m-phenylene diisocyanate, 3,3'-dichloro-4,4'-biphenyl diisocyanate, tetrachloro-p-phenylene diisocyanate.

Isothiocyanates also react with water in a basic medium to produce primary amines, but generally require more drastic conditions than the comparable isocyanates. The polyisothiocyanate which is preferred in accordance with this invention to cross-link halogenated chain polymers is: p-phenylene diisothiocyanate.

Amine salts, having the formula $RNHR_1X$, wherein R is a monofunctional organic radical, $R_1$ is selected from the group consisting of hydrogen and alkyl groups, and X is a monovalent non-oxidizing anion, also produce amines under vulcanization conditions and particularly at elevated temperatures and in the presence of an inorganic basic compound. Polyamine salts (either primary or secondary) may also be used as linking agents in accordance with this invention.

Among the particular polyamine salts which may be used are: hexamethylene diamine diacetate, hexamethylene diamine carbonate, 4,4'-diaminodiphenylmethane dihydrochloride.

Substituted ureas having the formula $R_1NR_2CONR_3R_4$, wherein $R_1$ is a monofunctional organic radical, $R_2$ and $R_3$ are selected from the group consisting of hydrogen alkyl and aryl groups, and $R_4$ is a member of the group consisting of hydrogen and monofunctional radicals, decompose at elevated temperatures to produce amines, having the formula $R_1NR_2H$, and isocyanates, having the formula $R_4NCO$, wherein $R_1$, $R_2$ and $R_4$ are defined as above.

Among the specific substituted ureas which may be used are: hexamethylenediurea, p-phenylenediurea.

It is to be noted that the decomposition of a substituted urea produces an isocyanate as well as an amine. The isocyanate group, as discussed above, also produces an amine group in the presence of moisture and particularly in the presence of a basic medium. Thus, $R_4$ may be selected to contain an isocyanate group or a urea group and thus produce an additional compound capable of forming a polyamine.

Carbamylhalides, and preferably chlorides, having the formula

wherein R is a monofunctional organic radical, decompose at elevated temperatures to produce hydrogen chloride and isocyanates having the formula RNCO. Similarly, polycarbamylchlorides may produce polyisocyanates and may, therefore, be used in accordance with this invention as linking agents for halogenated chain polymers.

Among the specific polycarbamyl halides which may be used in accordance with this invention are: hexamethylene dicarbamyl chloride, p-phenylene dicarbamyl chloride, methylenedi-p-phenylene dicarbamyl chloride, s-phenenyl tricarbamyl chloride, 4,4'-biphenyl dicarbamyl chloride, 4-methyl-m-phenylene dicarbamylchloride.

Urethanes having the formula $RNHCO_2Et$, wherein R is a monofunctional organic radical, decompose to produce isocyanates and ethanol. Polyisocyanates, as stated above, will react with moisture to produce polyamines and thereby act as linking agents.

Among the specific polyurethanes which may be used in accordance with this invention are: hexamethylenediurethane, p-phenylenediurethane, 4-methyl-m-phenylenediurethane.

Example 1

300 grams of an equimolar copolymer of chlorotrifluoroethylene and vinylidene fluoride, prepared by suspension polymerization in a redox system as described above, was banded on a laboratory size 6 x 13 inch rubber mill using water to cool the rolls. 15 grams of zinc oxide and 15 grams of methylenedi-p-phenylene diisocyanate (known commercially and referred to hereinafter as MDI) were added in succession, using standard procedures for cutting and mixing the compound. Despite the water cooling, the temperature during the milling operation ranged from about 120° F. to about 150° F. The compounded stock was then sheeted out to a thickness of 0.090 inch from which a preform was cut out to fit in a 6 x 6 inch rubber sheet mold. The mold with enclosed stock was placed in a press and the stock cured for one hour at 260° F. and 200 p.s.i.

Properties at this stage of the cure are listed below under Press Cure. The sheet was then placed in a circulating air oven operating at 212° F. for 16 hours for the final cure. Properties at this stage are listed below under Oven Cure.

|  | Press Cure | Oven Cure |
| --- | --- | --- |
| Stress at 300% E (p.s.i.) | 610 | 810 |
| Tensile strength (p.s.i.) ultimate | 800 | 1,000 |
| Percent E (at breaking point) | 350 | 375 |
| Hardness Shore A |  | 71 |

Example 2

100 grams of equimolar copolymer of chlorotrifluoroethylene and vinylidene fluoride, similar to that used in Example 1, 5 grams of zinc oxide and 5 grams of MDI were compounded, sheeted, and press cured by a procedure identical with that of Example 1. The sample was then oven cured for 16 hours at 230° F. This sample was subjected to white fuming nitric acid for 24 hours. The results from this exposure are shown below:

Original tensile strength _____p.s.i__ 1140
TS after 24 hr. in WFNA _____p.s.i__ 565
Volume swell after 24 hr. in WFNA ___percent__ 22.5

Most elastomeric materials decompose in a few minutes on exposure to white fuming nitric acid.

Example 3

100 parts of equimolar copolymer of chlorotrifluoroethylene and vinylidene fluoride, similar to Example 1, 5 parts of zinc oxide and 5 parts of MDI were compounded, sheeted, press cured and oven cured by a procedure similar to that of Example 1. A strip from this sample was subjected to tensile testing immediately after cooling and another strip was tested after 60 days of aging at room temperature. A comparison of the data is shown below:

|  | Original Test | 60 Day Test |
| --- | --- | --- |
| Tensile strength (ultimate) | 680 | 1,380 |
| Percent Elongation | 450 | 375 |

It is believed that the increased tensile strength during aging is due to the further formation of amine cross-linking agents from whatever diisocyanate remains unreacted after the oven cure.

Example 4

100 parts of an equimolar copolymer of chlorotrifluoroethylene and vinylidene fluoride, similar to that of Example 1, 5 parts of zinc oxide and 5 parts of 4-methyl-m-phenylene diisocyanate (known commercially as TDI) were milled in a rubber mill similar to that of Example 1, and then press cured in a mold similar to that of Example 1 for 20 minutes at 212° F. A sample was then subjected to an oven cure at 212° F. for 16 hours for the final cure.

|  | Press Cure | Oven Cure |
| --- | --- | --- |
| Stress at 300% E (p.s.i.) | 300 | 300 |
| Tensile strength (p.s.i.) ultimate | 900 | 1,700 |
| Percent E (at breaking point) | 600 | 580 |
| Hardness Shore A |  | 58 |

Example 5

100 parts by weight of an equimolar copolymer of chlorotrifluoroethylene and vinylidene fluoride, similar to that of Example 1, 5 parts of zinc oxide and 5 parts of p-phenylene diisothiocyanate were milled in a rubber mill similar to that of Example 1 and then press cured in a mold similar to that of Example 1 for 60 minutes at 260° F. A sample was then subjected to an oven cure at 212° F. for 16 hours for the final cure.

|  | Press Cure | Oven Cure |
| --- | --- | --- |
| Stress at 300% E (p.s.i.) | 425 | 425 |
| Tensile strength (p.s.i.) ultimate | 1,300 | 1,100 |
| Percent E (at breaking point) | 460 | 430 |
| Hardness Shore A | 59 | 59 |

Example 6

100 parts of an equimolar copolymer of chlorotrifluoroethylene and vinylidene fluoride, similar to that of Example 1, 5 parts of zinc oxide and 6 parts of hexamethylene diamine diacetate were milled in a rubber mill similar to that of Example 1, then press cured in a mold similar to that of Example 1 for one-half hour at 250° F. A sample was then subjected to an oven cure at 300° F. for five hours for the final cure.

|  | Press Cure | Oven Cure |
| --- | --- | --- |
| Tensile Strength, p.s.i. (ultimate) | 938 | 1,410 |
| Percent Elongation at breaking point | 480 | 490 |

Example 7

5-trifluoromethyl-m-phenylene diisocyanate was prepared by dissolving 5-trifluoromethyl-m-phenylene diamine in ethyl acetate and adding this solution to a mixture of phosgene in ethyl acetate. The precipitate that appeared initially disappeared after the mixture was heated and stirred with additional phosgene added. Nitrogen was then bubbled into the mixture to remove excess phosgene, the solvent was removed and the residue was distilled in vacuo to give an oil with a pungent odor in 89% yield. Boiling point 97–98° C. at six millimeters. Calculated for $C_9H_3F_3N_2O_2$: F., 24.98%. Found: 25.13%.

100 parts by weight of an equimolar copolymer of chlorotrifluoroethylene and vinylidene fluoride, similar to that of Example 1, 5 parts of zinc oxide and 5 parts of 5-trifluoromethyl-m-phenylene diisocyanate, prepared as described above, were milled in a rubber mill similar to that of Example 1, and then press cured in a mold similar to that of Example 1 for sixty minutes at 260° F. A sample was then subjected to an oven cure at 212° F. for 16 hours for the final cure.

Oven cure
Tensile strength p.s.i. (ultimate) _____ 750
Percent elongation at breaking point _____ 220

Example 8

3,3'-dichloro-4,4'-biphenyl diisocyanate was prepared by the treatment of 3,3'-dichloro benzidine with phosgene in the manner described above. The yield of product after distillation in vacuo, boiling at 175–180° C. at .05 millimeter, was 90%. After crystallization from benzene, the white solid melted at 170 to 172° C. Calculated for $C_{14}H_6Cl_2N_2O_2$: Cl, 23.24%. Found: 23.78%.

100 parts by weight of an equimolar copolymer of chlorotrifluoroethylene and vinylidene fluoride, similar to that of Example 1, 5 parts of zinc oxide and 5 parts of 3,3'-dichloro-4,4'-biphenyl diisocyanate, prepared as above, were milled in a rubber mill similar to that of Example 1, and then press cured in a mold similar to that of Example 1 for sixty minutes at 260° F. A sample was then subjected to an oven cure at 212° F. for 16 hours for the final cure.

|  | Oven cure |
|---|---|
| Tensile strength p.s.i. (ultimate) | 2300 |
| Percent elongation at breaking point | 250 |
| Hardness, Shore A | 71 |

Example 9

Tetrachloro-p-phenylene diisocyanate was prepared from tetrachloro-p-phenylene diamine, which was first converted to the dihydrochloride by the addition of hydrogen chloride to a solution of the amine in ethyl acetate. Phosgene was then passed into the mixture until most of the solid had dissolved. The insoluble byproducts were removed by filtration and the product was crystallized from the filtrate at 60% yield. Melting point: 109 to 111° C. Calculated for $C_8Cl_4N_2O_2$: Cl, 47.60%. Found: Cl, 48.33%.

100 parts by weight of an equimolar copolymer of chlorotrifluoroethylene and vinylidene fluoride, similar to that of Example 1, 5 parts of zinc oxide and 5 parts of zinc oxide and 5 parts of tetrachloro-p-phenylene diisocyanate, prepared as described above, were milled in a rubber mill similar to that of Example 1, and then press cured in a mold similar to that of Example 1, and then press cured in a mold similar to that of Example 1 for one hour at 260° F. A sample was then subjected to an oven cure at 212° F. for 16 hours for the final cure.

|  | Oven cure |
|---|---|
| Tensile strength p.s.i. (ultimate) | 1150 |
| Percet elongation at breaking point | 380 |
| Hardness, Shore A | 56 |

In all of the above examples it was found possible to compound the linking agent into the copolymer without scorching. This is in contrast to the difficulty which is found in the compounding of amine cross-linking agents into similar polymers.

The cross-linked halogenerated polymers prepared by this invention may be used for most of the purposes for which the chain halogenated polymers have been used. The only important exceptions are that they cannot be molded and cannot be put into solution after cross-linking. In a practical sense, however, in most cases, the cross-linking step can be performed as the final step in fabrication and thereby make subsequent solution or molding unnecessary.

If desired, the cross-linking agents of this invention may be used in combination with other cross-linking agents, including polyamines. In those cases where the cross-linking agents of this invention are used in conjunction with polyamines, smaller amounts of amines may be used than would otherwise be required. Thus, the effect of "scorching" may be minimized, if not completely eliminated. In any case, even if scorching is not completely eliminated, the resulting polymer is one which gains in strength during aging.

Molded articles can be made as described above by heating and compressing a mixture of the chain polymer and the cross-linking agent in a mold. The articles thus produced have all of the advantages of chemical inertness of the chain halogenated polymer, at the same time having greater toughness and better heat stability.

Films of cross-linked halogenated polymers, formed in situ, may be used for the protection of metallic surfaces against corrosive conditions. Such films have substantially the same chemical inertness as the films of chain polymer, but greater toughness and better heat resistance.

Self-supporting films of cross-linked polymer can also be advantageously made. In the case of rubbery copolymers, cross-linking produces vulcanizates of increased strength but unreduced or even superior extensibility.

The cross-linked polymers of this invention can also be used as wire coatings since the advantageous electrical properties of the halogenated polymers are only slightly reduced in cross-linking by the production of product materials.

The cross-linked polymers of this invention may also be used as impregnates and/or as coatings for yarns and fabrics, including the yarns and fabrics of asbestos, glass, synthetic resins, and natural fibers.

This application is a continuation of prior and copending application Ser. No. 416,445, filed March 15, 1954, now abandoned.

Having described our invention, we claim:

1. A process for cross-linking a linear elastomeric copolymer of trifluorochloroethylene and vinylidene fluoride which comprises uniformly admixing such a copolymer containing 20 to 69 mol percent trifluorochloroethylene with a polyisocyanate in the presence of moisture, maintaining the temperature during mixing not higher than 150° F. and thereafter fabricating the admixture into the desired form while simultaneously heating said admixture to a temperature above 150° F. to cause cross-linking of said linear copolymer during said fabrication.

2. The proces of claim 1 in which said cross-linking is effected in the presence of moisture initially present in the copolymer.

3. The process of claim 1 in which the cross-linking is effected in the presence of an added basic metal oxide.

4. The process of claim 1 in which said polyisocyanate is a diisocyanate.

5. The process of claim 1 in which said diisocyanate is methylenedi-p-phenylene diisocyanate.

6. The process of claim 1 in which said diisocyanate is 4-methyl-m-phenylene diisocyanate.

7. The process of claim 1 in which said diisocyanate is 5-trifluoromethyl-m-phenylene diisocyanate.

8. The process of claim 1 in which said diisocyanate is 3,3'-dichloro-4,4'-biphenyl diisocyanate.

9. The process of claim 1 in which said diisocyanate is tetrachloro-p-phenylene diisocyanate.

References Cited in the file of this patent

UNITED STATES PATENTS

| 2,405,008 | Berry et al. | July 30, 1946 |
| 2,468,054 | Ford | Apr. 26, 1949 |
| 2,577,381 | Stirnemann | Dec. 4, 1951 |
| 2,793,200 | West | May 21, 1957 |
| 2,979,490 | West | Apr. 11, 1961 |

FOREIGN PATENTS

| 604,834 | Great Britain | July 12, 1948 |
| 979,824 | France | Dec. 13, 1950 |